United States Patent [19]

Morton

[11] E Re. 30,084

[45] Reissued Aug. 28, 1979

[54] PICKING AND TRANSPORTING MEANS FOR FABRIC SECTIONS AND THE LIKE

[75] Inventor: Kenneth O. Morton, Troy, N.Y.

[73] Assignee: Cluett, Peabody & Co., Inc., New York, N.Y.

[21] Appl. No.: 831,771

[22] Filed: Sep. 9, 1977

Related U.S. Patent Documents

Reissue of:

[64] Patent No.: 3,940,125
Issued: Feb. 24, 1976
Appl. No.: 471,029
Filed: May 17, 1974

[51] Int. Cl.[2] ..... B65H 3/06; B65H 3/22; B65H 3/32

[52] U.S. Cl. ..... 271/10; 271/18.3; 271/21; 271/233; 271/269

[58] Field of Search ..... 271/19-25, 271/18.3, 16, 17, 14, 10, 267, 269, 233, 84, 189, 1

[56] References Cited

U.S. PATENT DOCUMENTS

| | | | |
|---|---|---|---|
| 234,469 | 11/1880 | Griffith et al. | 271/22 |
| 492,218 | 2/1893 | Lux | 271/21 |
| 2,042,734 | 6/1936 | Roy | 271/21 |
| 2,200,937 | 5/1940 | Stolper | 271/84 |
| 2,438,896 | 4/1948 | Bowen et al. | 271/269 X |
| 3,031,187 | 4/1962 | Sano et al. | 271/19 |
| 3,253,824 | 5/1966 | Southwell et al. | 271/22 X |
| 3,353,821 | 11/1967 | Smith et al. | 271/22 X |
| 3,442,505 | 5/1969 | Szentkuti | 271/21 X |

*Primary Examiner*—Bruce H. Stoner, Jr.

[57] ABSTRACT

A method and apparatus for separating a single ply of limp material, such as fabric from a stack of such plies, and transporting the separated ply to a predetermined destination. The apparatus includes a rotatable ply gripping wheel, cooperating with a ply holding shoe. By rotating the wheel in contact with the ply, while restraining an adjacent area, the ply is buckled into a wave, nipped and then picked off of the stack. The gripping wheel and pressing shoe maintain a predetermined geometric relation, while being capable of independent yieldable contact with an uneven ply stack. The gripping wheel and holding shoe are operable in conjunction with an insertable flat plate, which is effective to progressively free the remainder of the ply. Thereafter, the flat plate is utilized to transport the freed ply to a desired destination, while the picking unit independently returns to the ply stack to commence its engagement with the next subsequent ply. Laterally movable sweep arms are provided as moving positioning abutments to secure the desired orientation of the ply at its destination.

26 Claims, 22 Drawing Figures

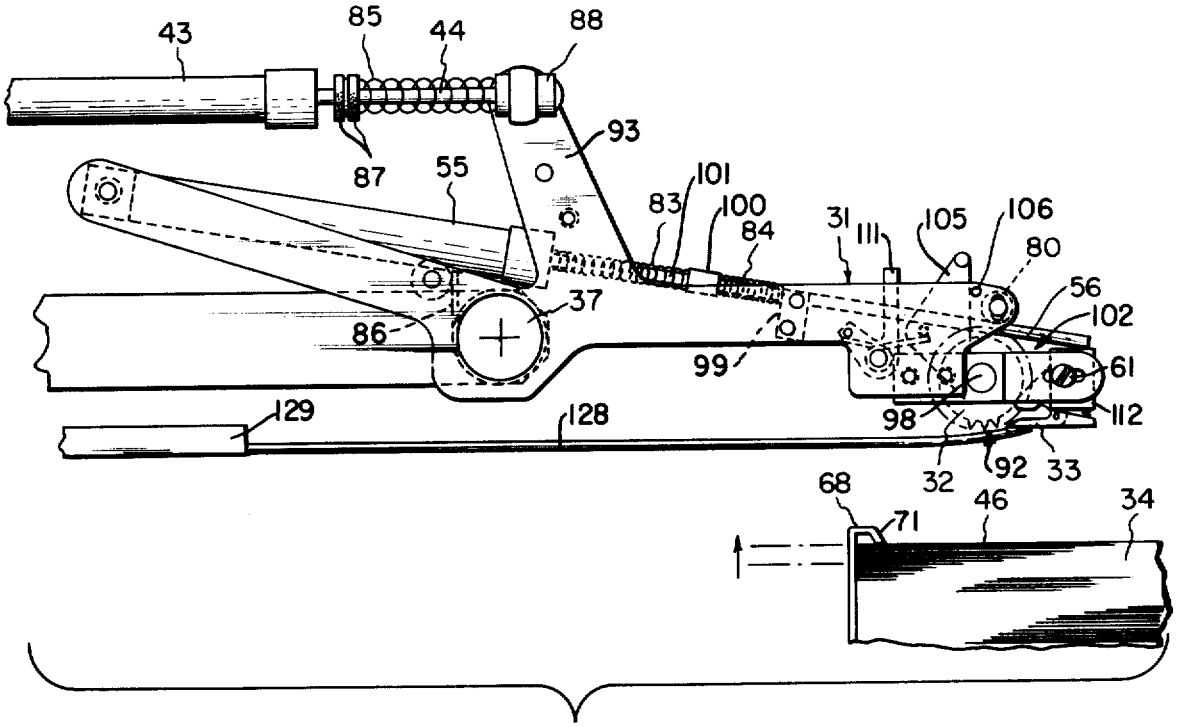
FIG. 3
FIG. 5
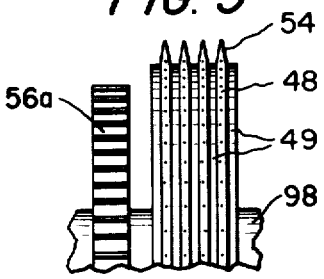
FIG. 4
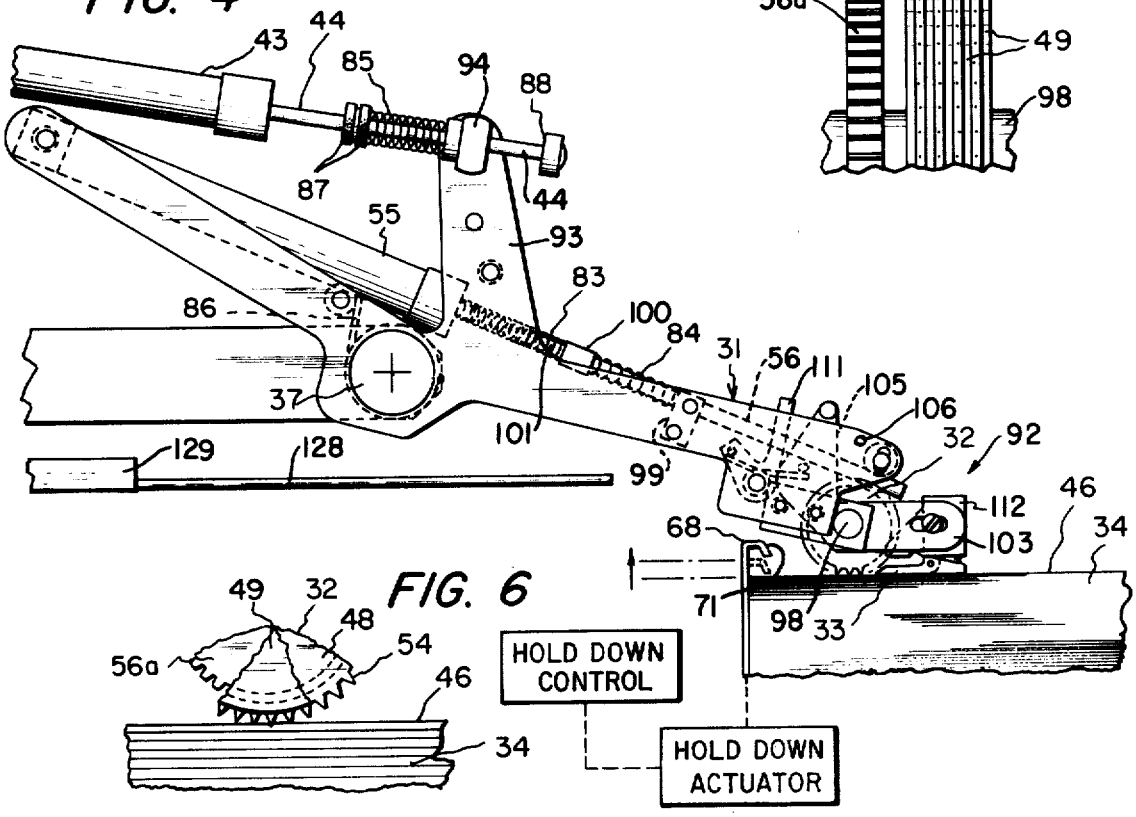
FIG. 6

FIG. 7
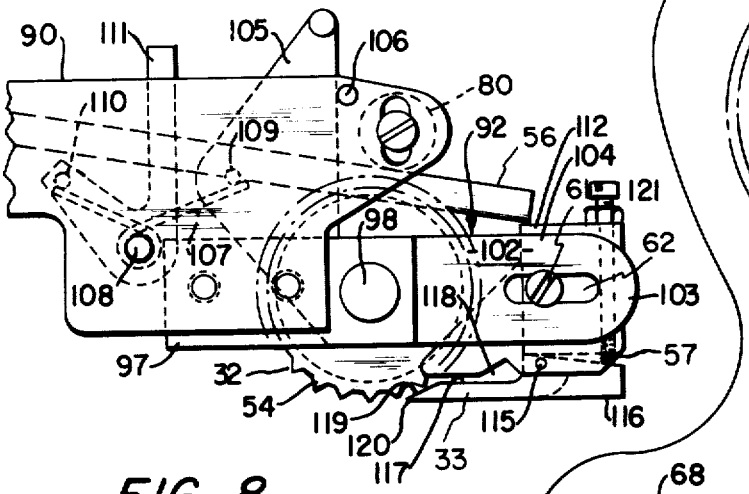
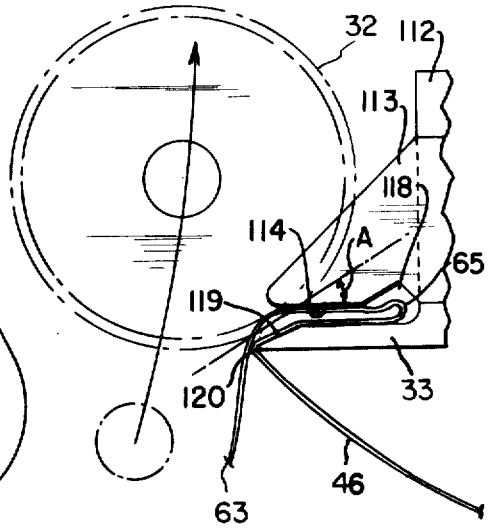
FIG. 8
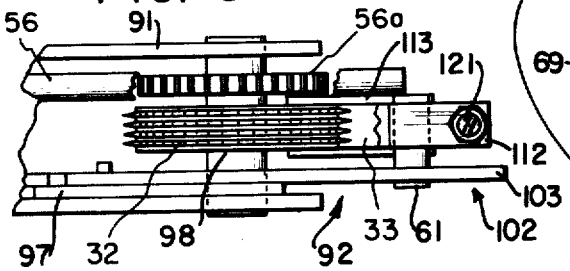
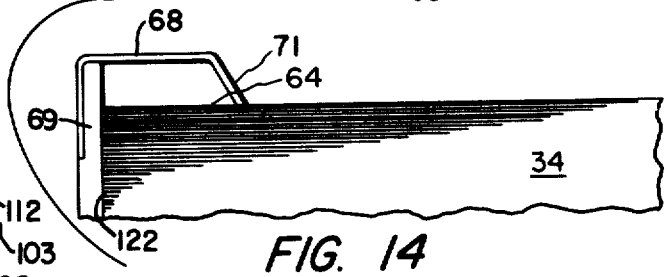
FIG. 14
FIG. 9
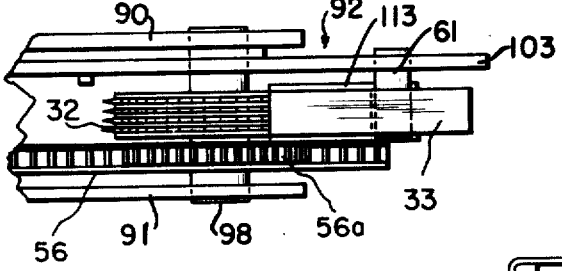
FIG. 11
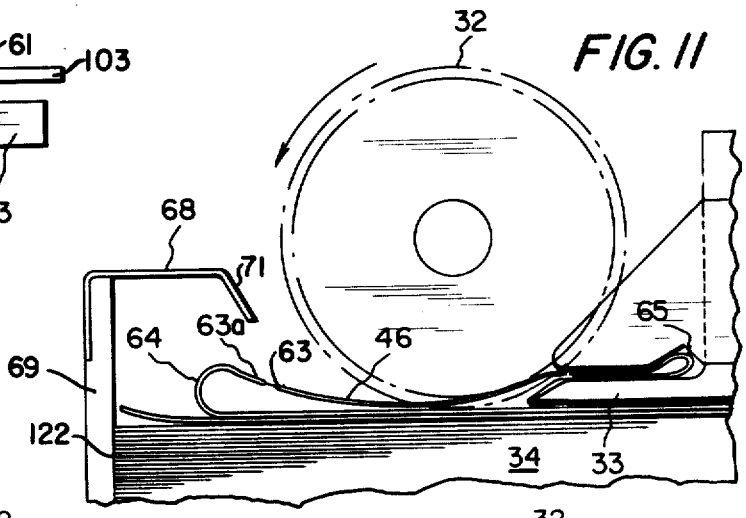
FIG. 10
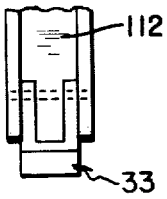
FIG. 12
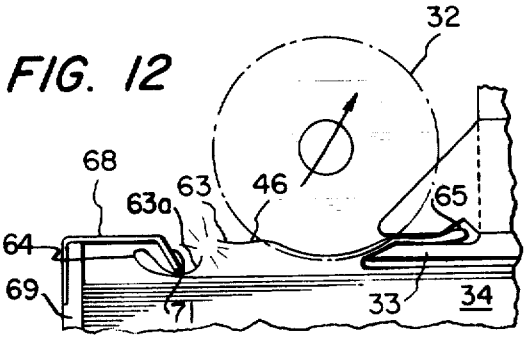
FIG. 13
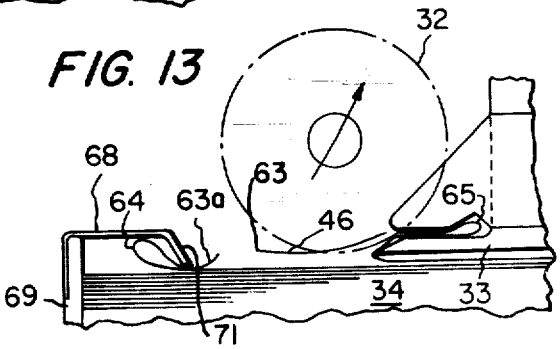

PICKING AND TRANSPORTING MEANS FOR FABRIC SECTIONS AND THE LIKE

Matter enclosed in heavy brackets [ ] appears in the original patent but forms no part of this reissue specification; matter printed in italics indicates the additions made by reissue.

BACKGROUND AND SUMMARY OF INVENTION

The present invention is directed to a novel and improved method and means for engaging and removing a ply of limp material, typically a piece of fabric, from a stack of such plies, and transporting the ply in a desired manner. In the production of garments, for example, it is conventional practice to cut simultaneously an entire stack of garment sections from a stacked lay-up of fabric sections. The cut stack of fabric sections is then transferred to a subsequent production operation, in which the sections are removed one at a time for sewing, etc.

In a continuing effort to automate production operations of all kinds, substantial effort has been devoted to the development of systems capable of lifting off and separating the uppermost ply of fabric from a stack of pre-cut fabric sections and transporting the separated ply to a desired location for performance of a production operation. Prior proposals for this purpose have involved the use of means such as suction devices or pressure sensitive tapes, for example, for lifting off the top ply of a stack. Other arrangements heretofore proposed have involved the use of needle-like elements for engaging and lifting off the uppermost ply of a stack. A still further proposal for this purpose is represented by the Lutts et al. U.S. Pat. No. 3,756,587.

Many of the above mentioned prior proposed arrangements are effective at a certain level, but each has disadvantages of one kind or another which limits its usefulness. For example, in an operation in which all conditions are fixed, with a single size and shape of ply and with the ply being at all times of the same material, it is frequently possible to adjust and adapt one or more of the various prior art devices for operation at a reasonable level of efficiency. However, in a more typical operation, the equipment may be called upon to handle parts of a variety of sizes and/or shapes and also to handle parts of different materials for which the prior art devices are not well suited. Even where a production operation involves only a single size and shape of part, serious problems may be experienced in dealing with a plurality of materials on different occasions. All of the prior art systems, insofar as the applicant is aware, have significant shortcomings in an environment requiring the handling of a variety of materials and/or shapes.

In accordance with one aspect of the present invention, an improved method and means is provided for effectively and reliably engaging, lifting and separating a ply of fabric or other limp material from a pre-cut stack thereof. To this end, the arrangement of the invention includes a novel and improved association of means for holding and restraining a portion of the top ply and means for frictionally gripping an adjacent area of the restrained ply and moving with it, first to form a wave in the ply and next in sequence to nip the wave. The new apparatus includes means for maintaining the gripping means and the restraining means in a predetermined geometrical association while, at the same time, enabling each to be brought independently into controlled and adjustably yieldable contact with the ply stack. In this respect, it will be understood that different ply materials may have widely different characteristics of stiffness, thickness, weight, roughness or smoothness, susceptibility to damage or marking, etc. Moreover, with fabric plies involving patterned weaves, a ply may have varying thickness and a stack of such plies may be wavy and uneven as a function of the cumulative effect of the individual ply variations. The apparatus of the invention uniquely accommodates such variable conditions and provides for reliable and effective operation under a wide variety of conditions.

In accordance with another aspect of the invention, novel and improved arrangements are provided for effectively limiting and controlling the pickup of a single ply from a stack thereof. In a typical production operation, a stack of cut plies will have been derived from a prior die cutting operation, in which a cutting die is driven through a lay-up of fabric elements to cut out an entire stack of shaped plies. Often such dies are not ideally sharp, causing the edge area of adjacent plies to fuse together (if of synthetic material) or to become entangled (if of natural fiber). As a result, in the picking up of a single ply, one or more adjacent plies often are dragged along by the edges, such that more than one ply are removed and/or the top of the stack is disarranged. In accordance with the present invention, the ply gripping and nipping means are located in spaced relation to the ply edges and function to displace one edge of the ply inwardly of the stack. If additional plies are attached to the displaced edge, they are rolled over and carried along with it for a short distance, after which they are temporarily engaged and effectively secured by a stack hold down element. Upon further displacement of the uppermost ply, it is separated along its displaced edge from the secured, underlying plies. Thereafter, and prior to the next ply removal operation, the stack hold down element is raised well above the stack, to permit the rolled over ply to return to its normal, flat condition on the stack.

As a further significant feature of the invention, a ply transport shutter means is provided for cooperative action with ply nipping and lifting means such that, when a single ply has been separated off of the stack and lifted at one edge, a plate-like transport shutter is inserted between the stack and the partially lifted ply, to complete the ply separation and thereafter to remove the ply from the area of the stack to another location. It will be understood, in this respect, that even after being nipped and separated from the stack at one edge, a ply may still be fused or entangled with lower plies of the stack along its other edges, such that simply attempting to lift the ply from the stack might well cause removal or displacement of one or more additional plies. Pursuant to the present invention, the plate-like transport shutter is actuated for movement generally in a plane parallel to the surface of the stack, and is inserted between the stack and lifted ply, while the stack hold down is in operation and while the lifted ply is still nipped, to progressively sever or disengage the lifted ply from the remainder of the stack. The transport shutter moves from the nipped edge of the ply toward its free edge, to keep the ply in tension while effecting progressive edge engagement. At the end of the disengagement stroke of the shutter, the freed ply rests on the upper surface of the shutter and can be transported away when the shutter is retracted. To advantage, while one ply is being transported by the shutter, another can be nipped and lifted, enabling optimum overall efficiencies to be realized.

In accordance with another feature of the invention, a method and means of simple construction yet high effectiveness is provided for reorienting a fabric ply, as necessary, after separation and transfer, to assure proper alignment of the ply with the sewing machine or other production apparatus. In this respect, it will be appreciated that the initial stack of plies may be somewhat irregular from its preliminary handling. Thus, the uppermost plies of the stack, as they are presented to the nipping elements, may be less than perfectly positioned in the first instance and may in any event be subject to a certain amount of displacement and disorientation in the course of nipping, lifting and transporting. In practice, ideal conditions are almost never experienced, and the separated ply is thus often in need of final positioning and orientation before processing. In the system of the invention, final positioning and orientation are achieved by means of a pair of sweep arms, which engage an edge of ply and are actuated through a lateral sweep movement along the ply edge, while the ply is lightly urged in the direction of such edge. This combined action quickly positions and rotationally orients the ply with respect to the reference axes of the system.

For a better understanding and appreciation of the above and other features and advantages of the invention, reference should be made to the following detailed description of a preferred embodiment and to the accompanying drawings. It should especially be understood that many of the features of the invention may be used to advantage individually as well as in association with some or all of the other features.

DESCRIPTION OF THE DRAWINGS

FIGS. 3 and 4 are enlarged, fragmentary views of a ply nipping and lifting mechanism incorporated in the system of FIG. 1, illustrating a sequence of positions of such mechanism.

FIGS. 5 and 6 are enlarged, fragmentary front and side views of a ply gripping wheel utilized in the mechanism of FIGS. 3 and 4.

FIG. 7 is an enlarged, fragmentary view of ply gripping and nipping elements incorporated in the new system.

FIGS. 8 and 9 are enlarged, fragmentary top and bottom views of a ply gripping wheel utilized in the new system, together with means for rotating the wheel.

FIG. 10 is a fragementary view of a restraining shoe means used in the new system for both restraining and subsequently nipping a ply of material.

FIGS. 11–14 are sequential views illustrating the manner of operation of the ply nipping and lifting means as incorporated in the system of the invention, in conjunction with stack holddown means.

DESCRIPTION OF A PREFERRED EMBODIMENT OF THE INVENTION

Figure 1:
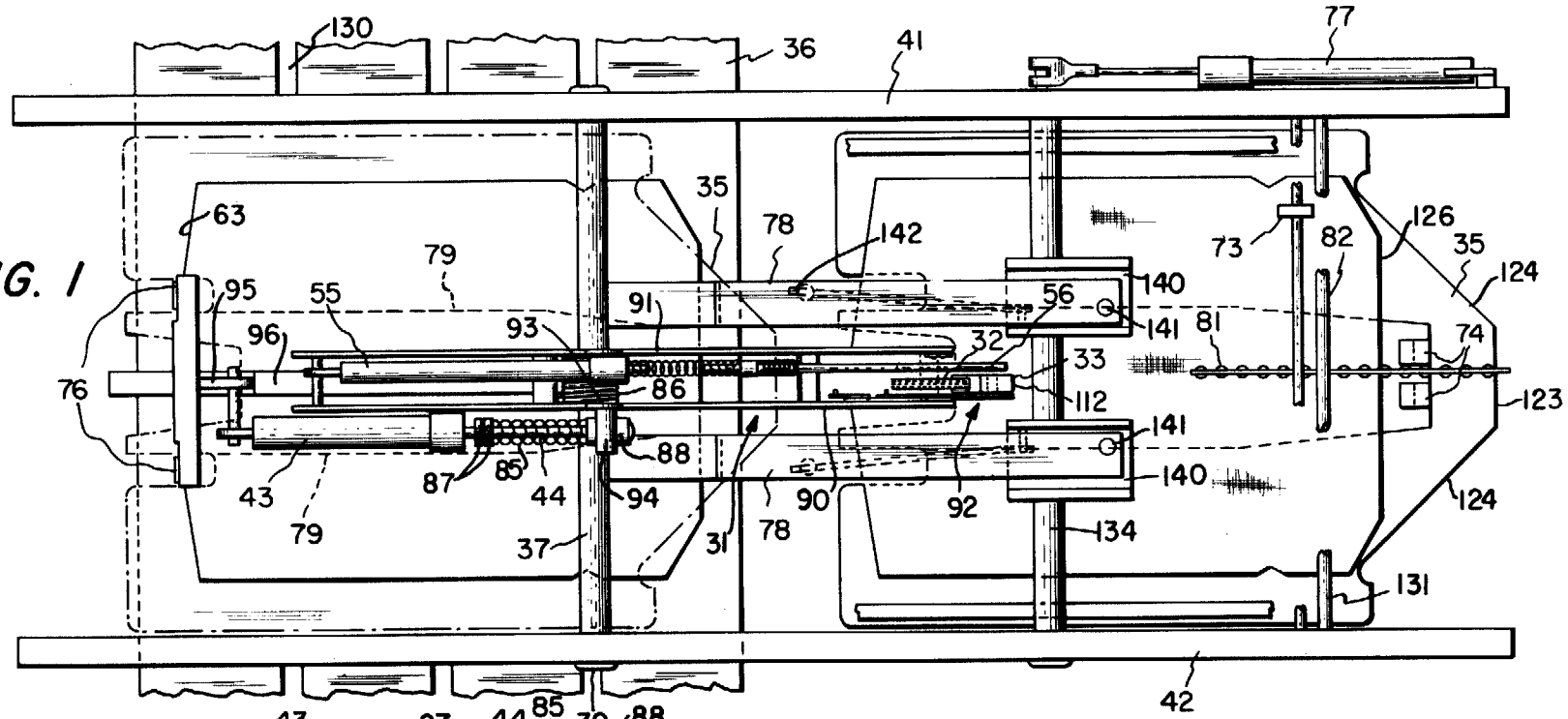
FIG. 1 is a top plan view of a ply separating and transporting system incorporating the features of the invention, as utilized, for example, in the handling of fabric sections in the manufacture of wearing apparel.
Figure 2:
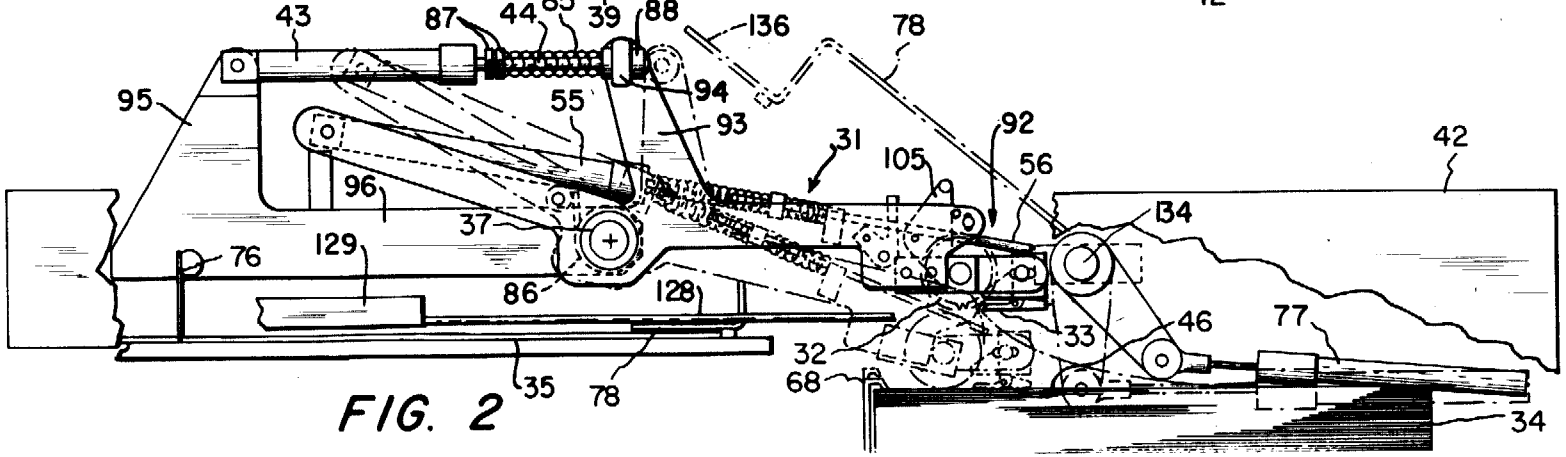
FIG. 2 is a side elevational view of the system of FIG. 1.
Figure 15:
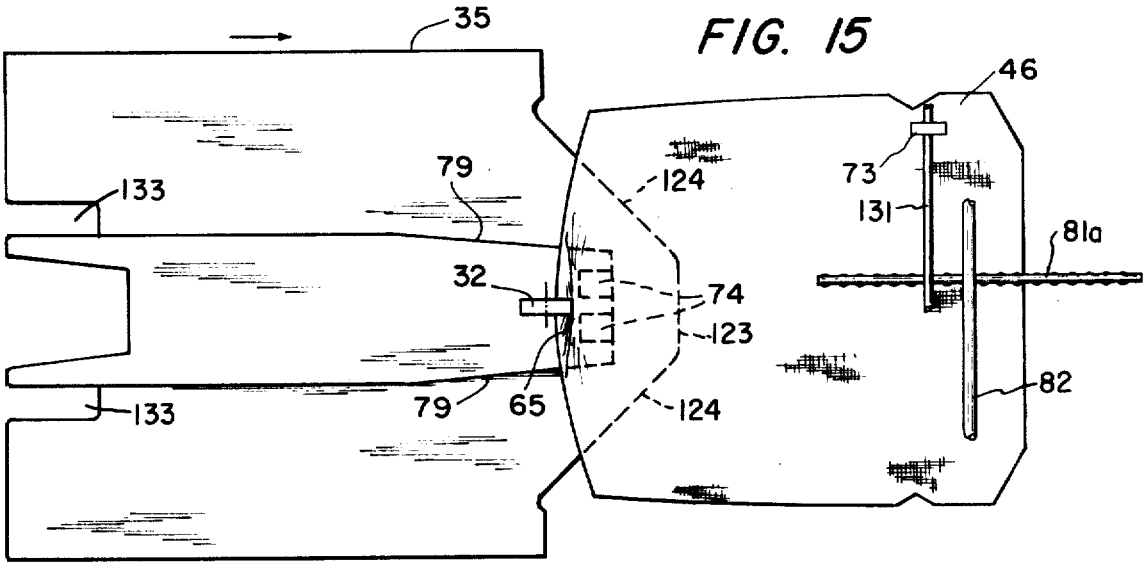
FIGS. 15–19 are sequential views illustrating the manner of operation of the transport shutter means in effecting completion of ply separation and transporting.

Referring now to the drawings, and initially to FIGS. 1 and 2 thereof, there is shown a ply lifting and transporting means as typically used in the performance of a subassembly operation in the manufacture of wearing apparel. A stack 34 of individual fabric sections (shirt pocket sections in the illustration) is supported along side a conveyor belt 36 leading to a sewing machine or other processing apparatus (not shown). The mechanism of the invention serves to nip, separate and lift plies of fabric, one at a time, from the stack 34, and to transport them to the conveyor belt 36. After proper positioning and reorienting of the fabric section, it is deposited on the belt 36 for conveyance to the processing apparatus.

Typically, the stack 34 of fabric plies may be several inches thick, comprising a large number of individual plies of material. The stack is received within a suitable stack guide and is supported by a movable platform. The stack guide and platform are purely conventional elements, forming no part of the present invention, and are therefore not illustrated. It will be understood, however, that the stack guide includes a plurality of vertically disposed guide elements for loosely guiding and containing the side and end edges of the stack 34. The platform, upon which the entire stack is supported, moves vertically within such guides and is controlled by suitable means of conventional and well known construction to maintain the top ply of the stack approximately at a desired, predetermined level. Thus, as plies are successively removed from the top of the stack, the reduced stack height may be sensed and the stack-supporting platform incrementally raised to raise the top of the stack to the desired height.

In its illustrated form, the apparatus includes a pair of frame members 41, 42 which support the working parts of the apparatus in desired relation to the ply stack and to the conveyor 36. A shaft 37 extends between the frame members and forms a pivot support for a lifting arm assembly, generally designated by the numeral 31, which comprises a pair of arm plates, 90, 91, journalled on the shaft 37 and connected together in spaced relation. At its outer end, the lifting arm 31 supports a ply picking unit, generally designated by the numeral 92, to be described in further detail.

As reflected in FIGS. 1 and 2, the lifting arm assembly 31 includes an upwardly extending lever arm 93. This arm is connected by a pin 94 to the piston rod 44 of a pneumatic actuator 43, sometimes referred to as the lifting actuator. The body of the lifting actuator is in turn connected to an upward extension 95 of a central frame plate 96, mounted in fixed relation to the outer frame plates 41, 42. To advantage, the actuator rod 44 is not directly connected to the pin 94, but is slidably associated therewith, with the pin 94 being urged against the head 88 of the actuator rod by means of a light, compression spring 85. The initial compression in the spring 85 is determined by means of threaded collars 87 adjustably positioned on the actuator rod. The arrangement is such that, when that actuator 43 is operated through a full stroke in the extending direction, the maximum torque imparted to the lifting arm assembly thereby will be accurately limited by the adjusted setting of the spring 85. The latter merely compresses when the arm assembly meets a predetermined resistance, permitting the rod 44 to slide through the connecting pin 94 (see FIG. 4). Desirably, the spring 85 has a relatively small spring constant, such that some degree of variability in the overtravel of the actuator rod may be accommodated without significantly affecting the compression force applied by the spring 85.

In the illustrated arrangement, the lifting arm assembly 31 is also acted upon by a torsion spring 86, which is adjusted as necessary to substantially offset any weight unbalance in the overall arm assembly. If desired this could also be accomplished by means of a suitably positioned counterweight. In either case, the objective is to closely balance the assembly, so that the operating pressures exerted by the arm may be very delicately and precisely controlled by the compression spring 85.

Mounted on the end of the lifting arm assembly 31 is a picking unit 92 which, when the lifting arm is lowered by extension of the actuator 43, is arranged to be brought into engagement with the uppermost ply 46 of the ply stack 34, for engagement with the upper ply in a manner to be described. The picking unit includes a pair of bearing plates 97 secured to the outer ends of the lifting arms 90, 91 and rotatably supporting a wheel shaft 98. Keyed or otherwise secured to the wheel shaft 98 is a ply gripping wheel assembly 32 and a drive pinion 56a therefor. The pinion 56a cooperates with a rack element 56, which is guided for longitudinal movement in meshing relation with the pinion 56a by means of a back-up roller 80 carried by the lifting arms.

At its inner end, the rack element 56 is guided by a bearing block 99 and is connected by a coupler 100 to the operating rod 101 of an air actuator 55. In accordance with one aspect of the invention, and as will be further described, the actuating rod 101 is normally urged to an initial static position intermediate its fully extended or fully retracted positions, by means of compression springs 83, 84 received over the actuating rod 101 and rack 56 respectively. The spring 83 acts between the end of the actuator and the coupler 100, while the spring 84 acts between the coupler 100 and the bearing block 99. The initial compression of the spring 83, 84 is such that the opposed compression forces are balanced when the actuator rod 101 is in an intermediate position, typically somewhat toward the extended position from the midpoint of its full stroke.

When the actuator 55, which may be referred to as the nipping actuator, is operated to retract the rod 101, the pinion 56a and associated wheel assembly 32 are rotated in a counterclockwise direction, as viewed in the drawings. Suitable means, not specifically shown, may be provided for adjustably limiting the retracting stroke of the actuator, although in general it is sufficient for the purposes of the invention to provide for a fixed stroke sufficient to achieve a counterclockwise wheel rotation of for example 95°-100°. As will be explained more fully hereinafter, the return or extending stroke of the nipping actuator 55 is arranged to be somewhat greater than the retracting stroke, after which the actuating rod 101 is permitted to return to its neutral or static position. To this end, the nipping actuator 55 is controlled by a four-way valve (not shown), with a one-shot pulse means being associated with the extending stroke. Thus, after retraction of the rod to rotate the ply gripping wheel 32 counterclockwise for 95°-100°, the four-way valve is reversed and a pulse of air introduced into the opposite end of the actuator 55, extending the rod 101 sufficiently to rotate the wheel clockwise through an angle greater than the counterclockwise rotation. After the pulse has been dissipated, both ends of the cylinder are exhausted and the actuated rod returns to its neutral position as determined by the respective spring 83, 84.

As reflected particularly in FIGS. 5-9, the ply gripping wheel 32 advantageously comprises an assembly of toothed discs 48 provided with a series of radially extending, relatively sharp teeth 54. Between the toothed discs 48 are spacer discs 49 of a somewhat smaller diameter, which provide lateral separation between the teeth 54 and also serve to limit the effective depth of the teeth. The specific configuration of the teeth 54 is not known to be critical, although a relatively sharp, somewhat sawtooth-type configuration has proven advantageous for use with respect to a wide variety of ply materials. The principal requirements of the surface characteristics of the wheel assembly 32 are that it be able to establish an effective gripping relationship with a single ply 46 of material on the stack 34, to move the ply laterally in the direction of its principal plane, without detrimentally marking or disfiguring the ply material. In one advantageous form of the invention, an effective wheel assembly 32, having a width of about one-quarter inch is provided with teeth 54 extending about 0.015 inch beyond the outer diameter of the spacing discs 49.

Pivotally supported by the wheel shaft 98 is a pressing unit generally designated by the reference numeral 102. The pressing unit includes a supporting lever 103, mounted on the wheel shaft and provided with an outwardly extending arm 104 and an upwardly extending arm 105. The arm 105 is normally urged into contact with an abutment stop 106, by means of a spring 107 carried by a shaft 108 and acting at its opposite ends on a pin 109 carried by the lever arm 105 and a pin 110 carried by a pressure adjustment lever 111. The pressure adjustment lever 111 is pivotally mounted on the shaft 108 and is frictionally or otherwise retained in a pre-set position. Counterclockwise pivoting of the adjusting lever 111 will result in the application of increased upward pressure by the spring 107, increasing the clockwise bias of the lever 103. Typically, the spring 107 is very light, affording a delicate bias adjustment of pivoting movements of the lever 103 about the wheel shaft 98.

Secured to the lever arm 104, typically by means of a mounting screw 61 received in an adjusting slot 62, is a pressing foot assembly 33a. In the illustrated construction, the pressing foot assembly 33a includes a body section 112, to which are secured a pair of spaced ply stripping plates 113. As reflected in FIGS. 8 and 9, the stripping plates 113 are positioned in straddling relation to the ply gripping wheel 32, preferably with the plates being positioned close against the outer discs of the wheel assembly. The lower surfaces 114 of the stripping plates 113 constitute stripping surfaces, and the positioning and orientation of the pressing foot on the lever arm 104 is such the the stripping surface extends in overlapping relation to the wheel assembly 32, to a point inside the radius of the spacing discs 49. In addition, in the region of intersection of the stripping surfaces 114 with the peripheral outline of the gripping wheel 32, it is desired that the stripping surfaces 114 lie at a relatively shallow angle to a tangent plane. As reflected in FIG. 14, for example, the stripping surface 114 are shown to lie at an angle "A" of less than 45° to the wheel tangent. The arrangement, as will appear, is such that a fabric ply engaged by the toothed discs 48 and urged toward the stripping surfaces 114, will be effectively displaced outwardly from and disengaged by the teeth 54 of the wheel without damaging or marking the ply material.

Pivotally secured to the block 112, as by means of a pin 115 (FIG. 7) is a pressing foot 33 having a pressing surface 116 along its bottom, which is adapted to press upon the ply stack 34, when the lifting arm assembly 31 is lowered by extension of the lifting actuator 43. If desired, the pressing surface may have a rough surface for enhanced gripping action, or may even have spikes or pins for use especially with stiff ply materials.

A small spring 57 is connected between the body portion 112 and the pressing foot 33, urging the foot to pivot clockwise about the pin 115 to a predetermined limit position, as reflected in FIG. 7, for example, in such limit position, the upper surface 117 of the pressing shoe desirably lies below the stripping surfaces 114 forming, in effect, a material receiving or accumulating slot 118. The pressing shoe 33 is also provided, in accordance with the invention, with a nipping surface 119 at its end adjacent the wheel assembly 32. The nipping surface 119 forms an acute angle with the bottom surface 116, so as to form a relatively sharp forward corner 120 and so as to be relatively evenly spaced from the outlines of the wheel assembly 32. The adjustment and orientation of the nipping and pressing foot on the lever arm 104 is such that, with the pressing foot 33 in its clockwise limit position, there is a gap between the nipping surface 119 and the wheel teeth 54 which is slightly greater than the thickness of one layer of the ply material.

In accordance with the invention, nipping of a single uppermost ply 46 from the stack 34, is accomplished by first energizing the actuator 43 to extend its operating rod 44 and pivot the lifting arm assembly 31 in a clockwise direction. When the picking unit 92 engages the top of the ply stack, a reaction or resistance force is imparted to the lifting arm 31, resisting further clockwise movement. The operating rod 44 nevertheless is extended through its full stroke, while the spring 85 compresses to accommodate continued movement of the rod without effecting further movement of the lifting arm. The effective force applied by the compression spring 85 is adjusted in accordance with empirical observations, to accommodate various materials, depending upon such factors as ply thickness, density, resilience, etc. When the compression of the spring 85 is properly adjusted, a full extension of the operating rod 44 will apply a delicately controlled pressure (e.g. a few ounces) to the ply stack 34, such that the gripping wheel assembly 32 will penetrate a single ply sufficiently to effectively grip that ply, but will not penetrate to the depth of a second ply. In some instances, it may be desired to pick exactly two plies off of the stack, which can be accomplished with the present apparatus by proper adjustment of its components including if needed, the use of a larger effective tooth depth on the wheel 32.

As the lifting arm descends onto the ply stack 34, the pressing shoe 33 engages the uppermost ply 46 somewhat in advance of the wheel assembly 32, causing the entire pressing unit 102 to pivot about the wheel shaft 98, against the biasing action of the spring 107. Thus, in the ply nipping position of the apparatus, as reflected in FIG. 4, the entire pressing unit 102 is displaced in a counterclockwise direction from its rest position, such that the pressing shoe 33 is urged downwardly onto the ply stack with a force which is effectively independent of that applied to the wheel assembly 32 and which is a function of the biasing force of the spring 107. This biasing force may, in accordance with the invention, be adjusted with precision by manipulation of the lever arm 111, so that a desired amount of pressing force may be applied to the stack. Typically, enough pressing force is applied to reliably hold the top ply against lateral displacement with respect to the shoe, without causing the fabric to be marked or otherwise disfigured. It will be understood, of course, that the pressing unit 102, being mounted for pivoting movement about a common axis with the gripping wheel assembly 32, does not change its geometrical relationship to the wheel when displaced against the resistance of the spring 107.

For a variety of reasons, the upper surface of the ply stack 34 may be relatively uneven. In part, such unevenness is accommodated by the spring-biased pivoting movement of the pressing unit 102, as above described. In addition, the pressing shoe 33 itself is permitted to orient about the axis of its pivot pin 115, to accommodate itself to the undulations of the stack. Thus, when the pressing foot assembly 33a descends, the shoe 33 may pivot against the biasing action of the spring 57. If desired, the biasing force of the spring 57 may be varied by means of an adjusting screw 121.

A typical ply nipping and lifting sequence is reflected schematically in the sequential views of FIGS. 11–14. Initially, the entire lifting arm assembly 31 is lowered by energizing the lift actuator 43, bringing the gripping wheel 32 into precisely controlled pressure contact with the upper ply, as determined by the spring 85, and likewise bringing the pressing shoe 33 into precisely controlled contact with the ply, under pressure determined by the setting of the spring 107. As reflected in the drawing, the geometrical relationship of the ply stack 34 and the lifting arm assembly is such that the wheel 32 and pressing foot assembly 33a engage the ply stack adjacent but spaced inwardly a short distance from the edge 122 of the ply stack (which, for purposes of description, may be considered as the forward edge).

After the arm assembly has descended onto the stack, the nipping actuator 55 is energized to retract its operating rod 101 and effect counterclockwise rotation of the gripping wheel 32. As will be appreciated, the teeth 54 of the gripping wheel, engaging the uppermost ply 46, drive the ply toward the right as viewed in FIG. 11 substantially in its plane. However, since the ply is held fixed by the pressing shoe 33, only the edge portion of the ply, to the left of the shoe, is permitted to move. As a result, the flexible ply material, in the short area between the bottom of the wheel 32 and the forward edge 120 of the nipping shoe, is buckled upwardly, and carried upward and to the right by the rotation of the wheel. After the first few degrees of rotation, the folded over leading edge of the upwardly buckled wave of the ply comes into contact with the stripping surfaces 114. With continued rotation of the wheel, the ply is progressively diverted outward from and stripped off of the wheel teeth by the stripping surfaces, and a loop or fold 65 of the ply material accumulates in the slot 118 above the pressing shoe. It will be appreciated, in this respect, that the material for the accumulating loop is drawn entirely from the left side of the pressing shoe 33, with the material under the shoe and to the right of it being held stationary by the pressure of the shoe.

In the initial adjustment of the pressing foot assembly on the lever arm 103, the nipping surface 119 is spaced slightly away from the wheel teeth 54 such that, when a ply loop is driven between the wheel and the nipping surface and on into the accumulation slot 118, the two layers of fabric are resiliently gripped between the surface 119 and the wheel assembly 32. At the same time, the spacing adjustment and the adjustment of the spring 57 is such that the wheel teeth 54 do not penetrate through to the lower fabric layer, at least while the shoe 33 is pressed against the ply stack and the wheel is in motion. If appropriate, the initial adjusted orientation of the pressing foot assembly 33a may be such that, when the lifting unit has descended to the FIG. 4 position, the pressing shoe 33 is caused to pivot counterclockwise a few degrees, to slightly increase the gap between the nipping surface 119 and the wheel 32. When a unit is lifted, the pressing shoe pivots back toward its initial position, to enhance the gripping action.

In the operation of the nipping unit, a full stroke of the nipping actuator 55, from its intermediate, neutral position, is calculated to achieve about 95°-100° of counterclockwise rotation of the wheel 32, to bring the uppermost ply 46 into the condition reflected in FIG. 11, with the loop 65 fully developed within the accumulation slot 118. As is frequently the case, the forward edge 63 of the uppermost ply 46 may be fused to or otherwise entangled with the forward edge 63a of one or more subsequent plies 64. In such cases, the forward edges of the subsequent ply or plies are dragged along, when the edge of the topmost ply 46 is displaced by rotation of the gripping wheel 32. Upon completion of the stroke of the nipping actuator 55, a typical condition of the fabric plies is as illustrated in FIG. 11.

In accordance with one aspect of the invention, a hold down element 68, movably carried by a support 69, is actuated by completion of the retracting stroke of the actuator 55 and caused to descend (by gravity or other means) upon the ply stack, to the position shown in FIG. 12. To advantage, the hold down element 68 includes a downwardly extending finger 71, which engages the top of the ply stack at a point spaced inward from the forward edge 122 of the stack a distance slightly less than the distance through which the uppermost ply 46 is displaced during the nipping movement of the wheel 32. Thus, when the hold down element 68 descends, the finger 71 presses down upon and restrains the folded over edge of the next ply or plies. Of course, if the plies separate satisfactorily in the first instance, the hold down finger merely descends to the top of the stack, in the manner reflected in FIG. 14. The downward projection of the finger 71 is desired to avoid pressing flat and thereby creasing a folded over ply section on the frequent occasions when edge entanglement does occur.

As reflected best in FIGS. 11-13, the operative geometrical relationships of the gripping wheel 32, and its actuator, and the hold-down finger 71 are as follows: First, the gripping wheel 32 is located so as to engage the top ply a short distance in from the stack. For purposes of identification, this distance may be referred to as a first predetermined distance. Second, upon full actuation of the nipping actuator 55, the upper ply is displaced through a distance, referred to herein as a second predetermined distance. The second predetermined distance is less than the first, such that the top ply remains underneath the gripping wheel 32 after actuation thereof, as shown in FIG. 11. Third, the location of the hold-down finger 71 is such that it will engage any folded over portion of a second ply which remains attached to the first ply. This relationship is also illustrated in FIG. 11. Thus, the location of the hold-down finger is at a third predetermined distance from the edge of the ply stack, and this third distance is less than the second predetermined distance, in order to clear the back edge of the first ply, but greater than half of the second predetermined distance, in order to overlie a folded over second ply. These various geometrical relationships, reflected in FIG. 11, are required in order for the hold-down finger 71 to operatively engage and hold back a folded over second ply, as frequently results from edge entanglement or edge fusing.

When the hold down element 68 has descended, the lifting cylinder 43 is actuated in the reverse or retracting direction, to raise the lifting arm 31 and with it the picking unit 92. The uppermost ply 46 is, at this time, firmly gripped by the wheel teeth 54 against the nipping surface 119 and is thus pulled toward, as indicated in FIGS. 12 and 13, causing the nipped ply 46 to be drawn away from the lower plies, held by the finger 71. This action effectively disengages the fused or entangled ply edges 63, 63a, at least in the area of the picking unit 92.

In special applications, where edge entanglement of the individual plies is a minor problem, it might be feasible to manipulate the picking unit 92, after raising of the arm assembly 31, to transport the lifted fabric section to a further destination, by bodily movement of the picking unit. However, in accordance with one aspect of the invention, significant advantages, as well as higher operating efficiencies, are realized by limiting the functioning of the picking unit to simply nipping and lifting of an edge of the top ply, and providing separate transport means for lifting and separating the balance of the fabric section and transporting it to its further destination. In this respect, in a typical stack of die cut fabric sections, edge fusing or edge entanglement can be a problem about the entire periphery of the fabric section. Thus, merely separating the plies along a forward edge section, by the procedures thus described, may not under all conditions be adequate to achieve effective separation of the uppermost ply.

Pursuant to the invention, after the picking unit 92 has been retracted to its raised position, as shown in FIG. 14, carrying with it the detached forward edge of the ply 46, a transport shutter 35 is actuated from its retracted position, shown in broken lines in FIG. 1, to an extended position, shown in full lines in FIG. 1. The shutter 35 is suitably guided and supported from the frame plates 41, 42, for reciprocating movement in a horizontal plane, between the extended and retracted limit positions reflected in FIG. 1. Any suitable actuating means may be employed, such as an electric motor driving an endless chain loop (not shown), to which the shutter is connected. A single cycle of the chain loop operates to advance the shutter from its retracted position to its advanced position and back again to its retracted position over the conveyor 36. The overall efficiency of the unit is enhanced by timing the operation of the picking and lifting mechanisms to synchronize with the transport mechanisms such that, while the shutter 35 is delivering a separated ply to the conveyor 36, the picking and lifting unit returns to the ply stack 34 to engage and nip the next ply.

In accordance with the invention, the shutter plate 35 is provided with a tapered leading edge, the narrowest portion of which is aligned with the picking unit 92. Thus, when a fabric ply is engaged and lifted by the picking unit, edge separation of a pair of plies may in some cases be completely effective only in the immediate vicinity of the picking unit itself. However, the narrow leading edge 123 of the transport shutter is able to enter between the top and lower plies in this narrow region. Then, as the shutter continues to advance, and while the top ply continues to be held in the picking unit and the hold down element 68 continues to hold all of the remaining plies of the stack, the tapered side edges 124 of the shutter progessively enter between the plies and effect complete separation of the forward edges 63, 63a. The shutter then continues to advance underneath the top ply 46, gradually lifting that ply up onto the surface of the shutter and simultaneously progressively separating any entangled edge areas of the top and lower plies until, finally, the entire leading edge area 123, 124 of the shutter emerges behind the back edge 126 of the top ply. When the shutter is thus in its fully advanced position, all of the edges of the top ply will have been freed from the stack, and the entire ply will have been lifted above the stack and will be resting upon the upper surface of the shutter. The shutter then immediately reverses direction and returns toward its retracted position over the conveyor 36, carrying with it the separated ply.

In the system of the invention, the gripping action of the picking unit 92 on the separate ply, during the progressive interpositioning of the transport shutter 35, is enhanced by the relatively sharp configuration of the shoe tip 120. This tip resists movement of the separated ply in the direction of shutter movement to the right, while the edges of the ply are being freed by the shutter.

As reflected in FIG. 1, the shuter plate 35, in its fully extended position, projects beyond the far edge 126 of the separated ply. Mounted on the upper surface of the plate, adjacent its leading edge are a pair of ply-positioning lugs 74. These are spaced a short distance on either side of the centerline of the shutter and include forwardly projecting lips 127 (see FIG. 6). The positioning lugs are adapted, upon the return or transporting stroke of the shutter 35, to engage the ply edge 126, to assure positive engagement of the separated ply and to assist in its positioning.

Figure 16:
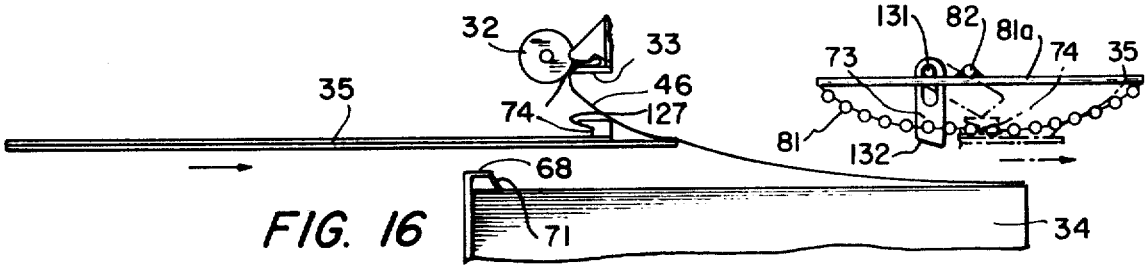
Figure 17:
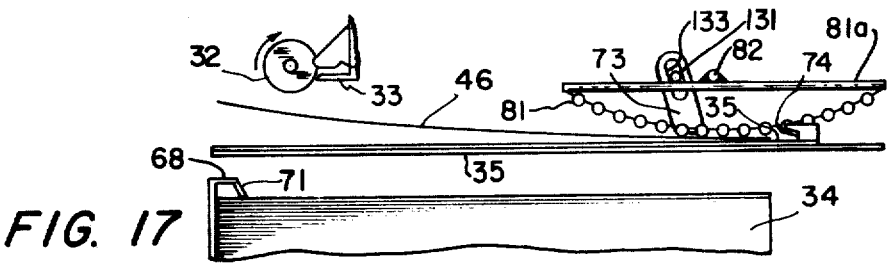
Figure 18:
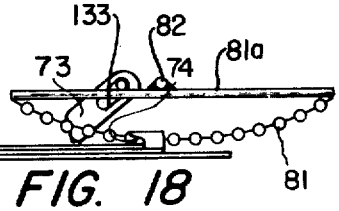
Figure 19:
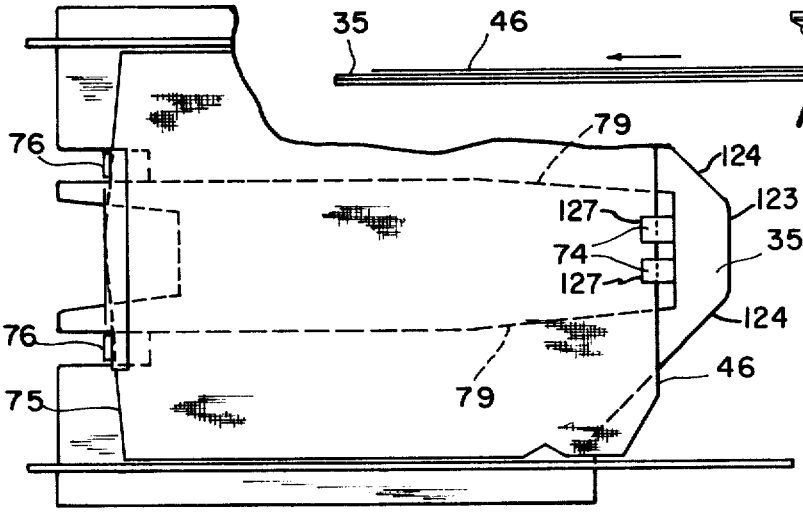

Not infrequently, the edges of the separated ply may exhibit a tendency to curl. Thus, to assure proper engagement of the positioning lugs 74 with the ply edge 126, a lightweight, displaceable hold down element is provided to engage the upper surface of the separated ply, as it is lifted by the advancing shutter plate and to hold the ply edge 126 flat against the plate, at least in the region of the positioning lugs 74, until the ply is engaged by these lugs. To advantage, the hold down member may be in the form of a short length of ball chain or the like 81 disposed longitudinally over the centerline of the plate 35 and suspended at both ends by a bar 81a carried by a transverse rod 82. As reflected in FIGS. 16–18, as the shutter plate 35 advances to its extended or pickup positions, the initially free-hanging chain 81 is displaced slightly upward, as the ply 46 is picked up and supported by the advancing plate. A portion of the chain lies between the positioning lug 74, so that at least in that area, the ply edge is held flat on the shutter plate. In some cases, the chain 81 may also be utilized to dissipate static electrical charges, if any, on the separated ply.

When the transport shutter 35 initiates its return movement, the separated ply typically is engaged by its back edge 126 and carried positively along with the transport shutter, until the shutter reaches the position shown in broken lines in FIG. 1. However, immediately prior to the commencement of return movement of the shutter, the leading edge of the fabric ply must be released by the picking unit 92 and freed to move with the shutter. In accordance with the invention, reliable and effective cast off of the separated ply from the picking unit 92 is achieved by effecting clockwise rotation of the gripping wheel assembly 32 through an angle of rotation greater than the counterclockwise rotation which occurs during the nipping operation. This is achieved, in accordance with the invention, by momentarily energizing the nipping actuator 55 in the extending direction, by means of a pulsing valve (not shown). Such momentary energizing of the actuator 55 causes its operating rod 101 to be extended to the right, as viewed in the drawings, through and beyond the "neutral" position otherwise determined by the static balance of the spring 83, 84. Thus, if the rotation of the wheel 32 during the nipping operation is on the order of 95°–100°, counterclockwise, the rotation of the wheel during the cast off operation typically is on the order of 10°–15° degrees greater, or in the range of 105°–115°, for example. This over rotation in the cast off direction assures that the fabric ply will be fully cleared from the picking unit at the time the transporting motion of the shutter plate 35 commences. After the energizing pulse to the actuator 55 has been exhausted and dissipated, the spring 84 will return the operating rod 101 to its neutral or static position. This will impart a slight counterclockwise rotation to the wheel 32, but this has no effect, since the ply has already been released by the picking unit.

In the system of the present invention, it is contemplated that the movement of the transport shutter 35 will be carried out at the relatively high speed (e.g. on the order of 24 inches per second). To make certain that the leading edge of the separated ply is not lifted by relative movement of the ply with respect to the air during the transport motions, hold-down guide means are provided, closely overlying the plane of the shutter plate 35 in the region between the picking unit 92 and the "destination" position over the conveyor 36. In the illustrated arrangement, the hold-down means includes a pair of longitudinally extending guide wires 128 supported in cantilever fashion by frame bars 129. The guide wires 128 extend in straddling relation to the picking unit 92 and, to advantage, are positioned slightly below the picking unit when the latter is in its upraised position, as shown in FIG. 3, for example. When the picking unit is raised with a nipped ply, the guide wires overlie the leading edge of the ply, on either side of the pick unit. As shown in FIG. 2, the shutter plate 35 is spaced slightly below the guide wires 128 and supports 129 such that, during the transporting stroke of the plate 35, the central portion of the ply is closely confined between the guides and the plate.

At some point in the operating cycle, after the topmost ply has been completely separated from the ply stack 34, the stack hold-down member 68 is released and raised sufficiently high above the stack to free and permit the return to relatively flat condition of any doubled-over end portion of a ply or plies. In a typical system, the control signal for raising the stack hold-down element 68 may be derived from the transport shutter 35 reaching its destination position. The hold down 68 then remains in its lifted position until the next operation of the picking unit 92, to engage the new topmost ply and displace it laterally to the position shown in FIG. 11. Conveniently, the hold down 68 may be an appropriately weighted element, which is drawn to its down or holding position by gravity and is lifted at the appropriate time in the operating cycle by a solenoid or other actuator means. Desirably, the hold-down element may also be utilized for actuating a stack height control switch (not shown). Thus, when the hold-down element, upon release and gravity movement to its holding position, drops beyond a predetermined limit point, a suitably positioned switch is actuated to incrementally raise the supporting platform for the play stack.

When the transport shutter 35 has reached its destination position, over the conveyor 36, the transported ply is engaged and held, during the return movement of the shutter plate for pick up of a subsequent ply. As the shutter plate moves out from underneath the restrained ply, it drops onto the conveyor 36, whereupon it is conveyed away to a subsequent processing operation, such as a sewing step. Since the ply is progressively released by the returning shutter plate, it is appropriate to momentarily stop the conveyor 36 while it receives the ply, to avoid skewing the ply by reason of the conveyor motion. Alternatively, a suitable receiving platform (not shown) may be extended up in the spaces 130 between the individual belt sections of the conveyor to receive the ply, holding it above the conveyor surface. After the shutter has completely released the ply, the platform may be withdrawn through the spaces 130 to deposit the ply onto the moving conveyor.

As will be readily appreciated, in the various handlings of the ply stack, various displacements and disorientations can and regularly do occur such that, when the ply is lifted by the picking unit and received on the transport shutter 35 in the first instance, it may be in a somewhat skewed position. Likewise, although it is intended that the back edge 126 of the separated ply be uniformly engaged by the positioning leg 74 in all instances, there may be occasions when the friction between the shutter and the ply will cause the ply to be accelerated with the shutter plate without coming into proper contact with the positioning lugs 74. It is nevertheless contemplated by the present invention that the separated and transported plies be placed upon the conveyor 36 in an accurately aligned and properly oriented condition, so that the plies can be effectively received and utilized in the processing station which comprises the destination of the conveyor 36. To this end, a variety of positioning and orienting means is provided in the illustrated system.

To assist in the proper initial engagement of the ply edge 126 with the shutter plate positioning lugs 74, it may be advantageous to utilize a plurality of light weight drag bars 73, which are loosely suspended over the play stack 34 by means of a transverse rod 131. The drag bars are arranged to hang freely from the supporting rod 131 and have ply engaging surfaces 132. When the transport shutter plate 35 is actuated to its extended position, lifting up a separated ply, the drag bars are lifted slightly and swung toward the rear edge of the ply. When the shutter plate 35 subsequently reverses direction, the ply is restrained by the drag bars 73 and urged to slide over the top of the shutter plate 35 until engaged by the positioning lugs 74. At that time, the restraining action of the drag bars 73 is overcome, the bars are lifted further in their retaining slots 133 and pivoted around with the movement of the ply, as reflected in FIG. 18, for example.

When the transport shutter 35 reaches its destination position over the conveyor 36, the leading edge 63 of the ply is brought into engagement with a pair of widely spaced positioning lugs 76, which are supported by the central frame plate 96 and extend downward below the plane of the shutter plate 35. Appropriate recesses 133 are provided in the shutter plate for the accomodation of these positioning lugs. As will be appreciated, the location of the lugs 76 is such, in relation to the location of the shutter-mounted lugs 74 that, when the shutter plate is in its destination position, the transported ply is engaged at both end edges by the lugs 74, 76.

In accordance with one aspect of the invention, a novel and highly effective means is provided for both positioning and orienting the transported ply before depositing the ply on the conveyor 36. To this end, the equipment includes a pair of retractable sweep arms 78 mounted on a rock shaft 134 journalled in the frame plates 41, 42. The shaft 134 is connected by a lever arm 135 to a sweep arm actuator 77 anchored to the machine frame. When the actuator 77 is energized to its extended condition, the shaft 134 is rotated clockwise and the sweep arms are raised up above the transport plate 35. When the actuator is retracted, the arms are lowered, and downwardly offset extensions 136 of the sweep arms are positioned to overlie in paralled relation the shutter plate 35 and the trailing edge region of the separated ply, when the transport shutter is in its destination position.

Figure 20:
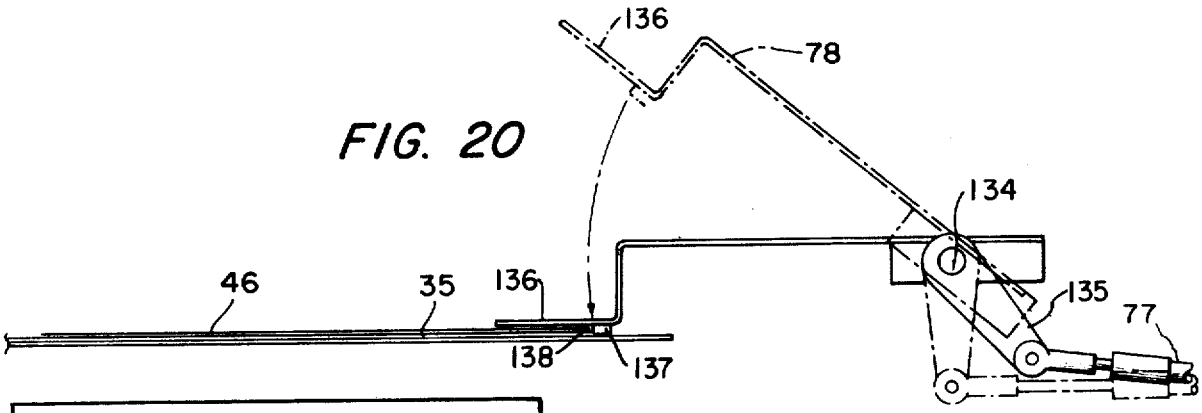
FIGS. 20–22 are sequential views illustrating the manner of operation of the ply positioning the reorientation means of the invention.

As reflected best in FIG. 20, the offset extensions 136 of the sweep arms are provided with downwardly projecting positioning lugs 137, which are somewhat thicker than the thickness of the separated ply 46. When the sweep arm actuator 77 is retracted, these lugs 137 are brought to bear resiliently on the upper surface of the transport plate 35, with a surface sliding relationship, such that the plate may subsequently be actuated to move back to its extended or ply pick up position, with the lugs 137 remaining in contact with the plate and sliding over its upper surface. The forward-facing edges 138 of the lugs 137 form positioning abutments, for engagement with and alignment of the rear ply edge 126, in the manner to be described. In this connection, the respective sweep arms 78 may include provisions for slight longitudinal adjustment, to effect precise alignment of the positioning lugs 137.

After lowering of the sweep arms 78, the transport shutter plate 35 may commence its extending movement to the ply pick up position. As it does so, the ply edge 126 will tend to engage at least one of the vertical abutment surfaces 138. However, particularly with the desired rapid movement of the transport shutter contemplated by the present invention, the mere movement of the shutter cannot be relied upon to effect proper rotational orientation of the ply in all cases, even though the ply will be driven up against one of the positioning lugs 137. Thus, if the transported ply 46 is slightly rotationally disoriented, as reflected in broken lines in FIG. 22, as the shutter 35 moves to the right, the ply edge 126 will be urged into engagement with one of the positioning lugs, but the frictional forces of the shutter plate moving out from under the disoriented ply are not reliably effective to urge the disoriented ply into contact with the second positioning lug. Accordingly, as novel feature of the invention, provisions are made for effecting a laterally outward sweeping movement of the sweep arms 78 during the extending movement of the shutter 35. The combination of such manner has been found to be highly effective in bringing about the desired reorientation of the ply, so that it is properly aligned with the conveyor 36 as it is deposited thereon.

The desired sweeping action of the sweep arm 78 is achieved in the illustrated apparatus by providing a cam plate 139 on the upper surface of the shutter 35. The cam plate is provided with opposed divergently related cam surfaces 79 in its leading section, arranged for engagement with the inwardly facing side edges of the sweep arm positioning lugs 137.

Figure 21:
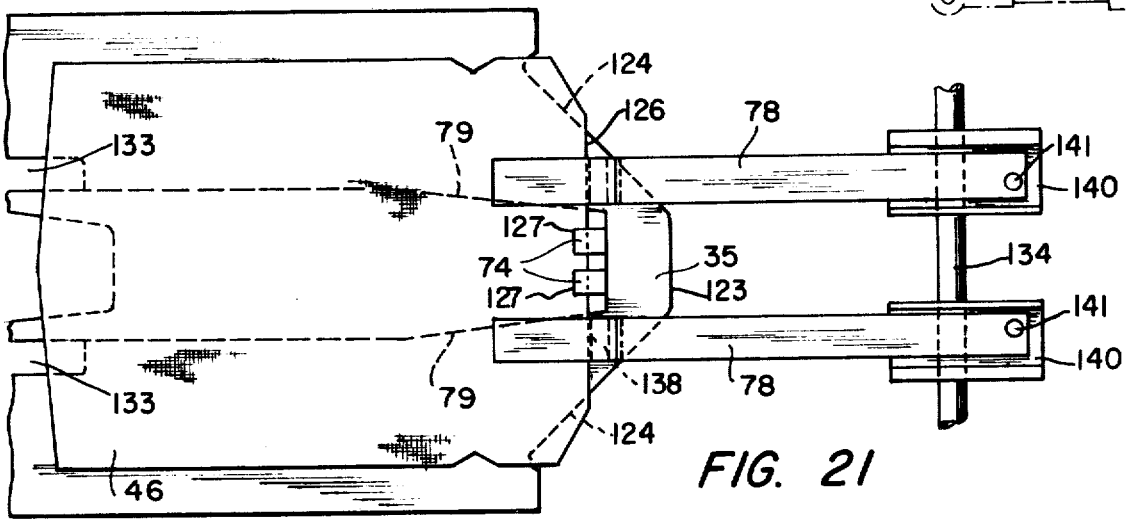
Figure 22:
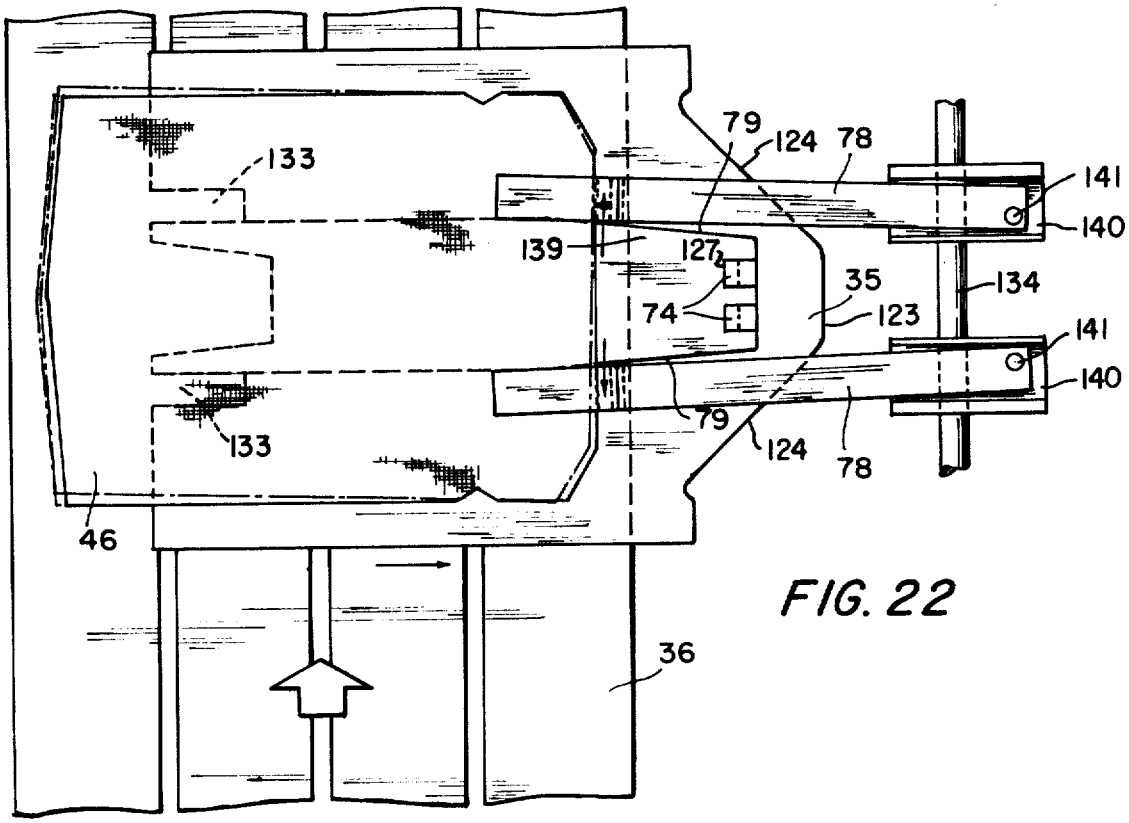

When the shutter plate 35 is in its destination position, and the sweep arms 78 are initially lowered, the divergent cam surfaces 79 will lie slightly inside of the positioning lug 137, as reflected in FIG. 21, for example. Then, as the shutter moves to the right, as indicated in FIG. 22, the lugs are engaged by the cam surfaces 79, and the sweep arms are displaced laterally outward. This outward movement is accommodated by pivotal mounting of the sweep arms on support blocks 140, by means of pivot 141. Spring means 142 (FIG. 1) urge the sweep arms 78 in the return direction, when released by the cam surfaces 79.

As the sweep arms 78 are displaced outwardly, with a sweeping action, the abutment surfaces 138 act upon the ply edge 126, which is confined between the shutter plate and the arm extensions 136. The full sweeping stroke advantageously is completed within a short distance of travel of the shutter plate 35 in the advancing direction. This combined sweeping action and plate motion has been found to be highly and reliably effective in quickly orienting the transported ply, so that it is deposited properly on the conveyor 36 as the shutter is progressively withdrawn.

After the shutter plate has moved completely out from under the transported ply, the ply drops away from the sweep arms 78. Thereafter, the sweep arm actuator 77 may be extended to raise the arms above the plate to permit a subsequent ply to be transported to the destination position.

It will be appreciated, of course, that various of the inventive features herein described, while useful and even synergistic in combination, may in many cases be used to significant advantage by themselves. The picking unit for example has important independent features of novelty, among which are provisions for independent movement of the pressing foot assembly with respect to the gripping wheel, while maintaining the operative geometrical relationships between these elements, so that the picking unit will accommodate itself to uneven contours of a ply stack. First, the entire picking unit is arranged to be lowered onto the ply stack with a delicate, easily adjustable and accurately controlled pressure, determined by the precompression setting of the spring 85. In conjunction with this, the pressing foot assembly itself is independently yieldably mounted in the picking unit assembly.

In the system of the invention, the picking unit is advantageously positioned to grip the top ply of a ply stack adjacent but spaced from the forward edge of the ply. The picking unit functions initially to displace the forward edge of the ply toward the back edge, while an intermediate portion of the ply is restrained by the pressing foot. This forms a wave in the ply, which is guided into an accumulation slot, forming an upwardly displaced buckle or fold in the fabric, which is easily nipped for withdrawal of the forward edge area of the ply. Since most typical commercial installations of equipment of this type will require the handling of ply stacks in which at least some of the plies will be fused or entangled at the edges, a stack hold-down element is provided, to engage the top of the ply stack in a limited area, spaced inward from the forward edge of the plies a distance slightly less than the extent of lateral displacement of the topmost ply effected by operation of the picking unit. Thus positioned, the hold-down unit may descend upon the ply stack, after actuation of the picking unit but before lifting of the nipped ply, to secure the underlying plies, including any that may have been looped over and dragged along with the nipped ply because of edge entanglement. The location and functioning of the hold-down element provide for significantly improved operation of the overall system, in any operations in which edge entanglement of the plies is likely to be experienced which is the usual case.

Although the picking unit of the invention is designed and intended principally for picking up a single ply, exluding others, there are some circumstances under which it is desired to pick up plies two at a time. In this respect, the picking mechanism of the invention can easily be adjusted to pick up precisely two plies, by control of wheel pressure, selection of appropriate wheel tooth depth, and the like.

Another particularly advantageous feature of the invention resides in the combined use of a picking and lifting mechanism for freeing a limited forward edge area of the top ply, after which the remainder of the ply is freed from the stack by the progressive interposition, between the partially lifted ply and the balance of the stack, of a flat plate-like shutter. To best advantage, the leading edge of the shutter is tapered, to gradually complete the severing action along the front edge of the ply; progressive severing of the back edge of the ply is automatically achieved by the progressive interposing movement of the shutter, as will be understood. While the shutter is being interposed between the upper ply and the balance of the stack, the ply itself is being securely held by the picking unit while the balance of the stack is being retained by the hold-down element. In this respect, the specifically illustrated equipment, intended for the handling of relatively small parts such as shirt pocket patches, functions effectively with a single picking unit and single hold-down element. For larger ply sections, it may be advantageous to utilize two or more picking units. Typically, there will be a hold-down element associated with and in alignment with each of the picking units.

Another of the advantageous features of the invention resides in the provision, in the picking unit, of an actuating arrangement for gripping wheel 32 which provides for a greater displacement of the wheel in the cast off direction than in the pickup direction. In this respect, in providing for effective and reliable nipping of the fabric between the gripping wheel and the pressure shoe, it is equally important to assure that the nipped fabric is reliably cast off and freed from the picking unit for the transport phase. If there is any hang up of the fabric on the picking unit, the ply will be crumpled at the start of the return movement of the transport shutter, and the equipment will malfunction. With the mechanism of the present invention, a simple yet highly effective overtravel motion is provided for the cast off operation, by arranging for a neutral or static position of the actuator, between the extremes of its stroke. On the return or cast off stroke, the actuator is momentarily pulsed and then exhausted, so that it is driven through and beyond its neutral position to achieve the desired over-travel movement in the cast off operation. After full release of the ply, the mechanism returns to its neutral or static position.

Another highly advantageous feature of the invention resides in the provision, for cooperation with the transport shutter plate, of laterally moving sweep arms, which form laterally moving edge abutment means for a transported ply, which is being released by the transport shutter. The lateral sweep motion of the edge abutments in conjunction with longitudinal releasing motion of the shutter plate is highly effective in achieving proper angular orientation of a ply at the conclusion of the transport phase.

It should be understood, or course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A picking apparatus for nipping and lifting a limp ply, which comprises
   a. ply gripping means including a movable ply gripping surface,
   b. means for moving said ply gripping surface into controlled pressure contact with the top ply of a ply stack, whereby movement of said surface will effect displacement of the ply generally in the plane in which the ply initially rests,
   c. a stationary ply retaining means positioned adjacent said movable gripping means,
   d. means for moving said ply retaining means into contact with said top ply whereby upon movement of said gripping surface toward said retaining means, said ply is buckled into a wave between said surface and said retaining means, and
   e. means for gripping and lifting said wave,
   f. said ply gripping and said ply retaining means being mounted for individually controlled pressure contact with adjacent portions of the top ply of a ply stack,
   g. said ply gripping means comprising a controllably rotatable ply gripping wheel having a ply gripping surface, and
   h. said ply retaining means being mounted for pivoting movement about the axis of said wheel.

2. A picking apparatus according to claim 1, further characterized by
   a. support means for said ply gripping means,
   b. first yieldable means associated with said support means and said gripping means for urging said ply gripping wheel against said ply stack with a predetermined adjustable force, and
   c. second yieldable means independent of the first yieldable means and associated with said ply retaining means for urging said retaining means against said ply stack.

3. A picking apparatus according to claim 2, further characterized by said second yieldable means comprising spring means acting between said ply gripping means and said ply retaining means to urge said ply retaining means to move relative to said gripping means.

4. A picking apparatus for nipping and lifting a limp ply, which comprises
   a. ply gripping means including a movable ply gripping surface,
   b. means for moving said ply gripping surface into controlled pressure contact with the top ply of a ply stack, whereby movement of said surface will effect displacement of the ply generally in the plane in which the ply initially rests,
   c. a stationary ply retaining means positioned adjacent said movable gripping means,
   d. means for moving said ply retaining means into contact with said top ply whereby upon movement of said gripping surface toward said retaining means, said ply is buckled into a wave between said surface and said retaining means,
   e. means for gripping and lifting said wave,
   f. said ply gripping and said ply retaining means being mounted for individually controlled pressure contact with adjacent portions of the top ply of a ply stack,
   g. support means for said ply gripping means,
   h. first yieldable means associated with said support means and said gripping means for urging said ply gripping surface against said ply stack with a predetermined adjustable force,
   i. second yieldable means independent of the first yieldable means and associated with said ply retaining means for urging said retaining means against said ply stack,
   j. said support means comprising a pivotally mounted lifting lever,
   k. means for effectively substantially balancing said lever,
   l. said first yieldable means comprising an actuator element operable through a predetermined stroke, and a spring interconnecting said lifting lever and said actuator, and
   m. adjustable means interconnecting said spring and said actuator element for controlling the amount of displacement of said spring caused by the predetermined stroke of said actuator.

5. A picking apparatus for nipping and lifting a limp ply, which comprises
   a. a movable gripping member movable about an axis and having an arcuate ply gripping surface,
   b. lifting means supporting said member for rotary movement of its gripping surface about said axis,
   c. means forming a ply stripping element extending from a point outside the arcuate surface of the gripping member to a point within the projected configuration of the member and disposed at a relatively shallow angle with the gripping surface of the member at the point of intersection of said stripping element with said gripping surface,
   d. ply retaining shoe means positioned to yieldably press upon the ply stack, adjacent said ply gripping member, whereby ply material displaced by movement of said member is caused to buckle into a wave in the region between said member and said shoe, and
   e. said stripping element and said shoe means forming an accumulation cavity for receiving said wave.

6. A picking apparatus according to claim 5, further characterized by a. means for actuating said gripping surface through a predetermined distance in one direction to effect a predetermined accumulation of ply material, and b. said means for actuating being operative to drive said gripping surface through a greater distance in the opposite direction to effect cast off of the accumulated ply material.

7. A picking apparatus according to claim 6, further characterized by a. said ply gripping member comprising a wheel, b. said means for actuating comprising a double-acting fluid actuator having a static position intermediate the limits of its strokes.

8. A picking apparatus according to claim 5, further characterized by a. said ply gripping member comprising a toothed wheel assembly, means mounting said ply retaining shoe means for pivotal movement about the axis of said wheel, and c. yieldable means urging said shoe means to pivot about said axis in the direction of the ply surface.

9. A picking apparatus according to claim 8, further characterized by a. said retaining shoe means including a supporting member mounted for pivoting movement about the wheel axis, and b. said shoe means further including a pressing shoe pivotally mounted on said supporting member and engageable with the surface of the ply material.

10. A picking apparatus according to claim 9, further characterized by a. said pressing shoe having a gripping surface facing and spaced slightly from said wheel and accommodating the passage of a wave of buckled ply material, and b. spring means normally urging said pressing shoe to pivot in a direction urging said gripping surface toward said wheel.

11. A picking apparatus according to claim 5, further characterized by a. first adjustable spring means urging said gripping surface into contact with said ply material, and b. second adjustable spring means, independent of said first spring means, for urging said ply retaining shoe means into contact with said ply material.

12. An apparatus for picking and separating plies of limp material, one at a time, from a stack, which comprises a. gripping means for engaging the top ply and displacing it away from one edge of the ply stack, b. said gripping means engaging the ply at a first predetermined distance from said one edge, c. pressing means engaging the ply stack adjacent the gripping means and on the side thereof away from said edge, to restrain the upper ply against movement and thereby causing said fabric to be formed into a wave between said gripping and pressing means, d. ply stack hold-down means engageable with the top of the stack in a region spaced from said edge, e. said hold-down comprising a first portion extending above the stack in spaced relation and a second portion extending downward to engage the stack in a limited area spaced inward from said edge, f. actuating means of limited effective stroke for actuating said gripping means through a movement of limited displacement to displace said top ply a second predetermined distance from said edge, g. said second predetermined distance being less than said first predetermined distance, and h. the second portion of said hold-down means engaging said stack in a region spaced from said edge a third predetermined distance, less than, but greater than half of, said second predetermined distance, whereby following displacement of a ply by said gripping means, said hold-down means engages said ply stack at a point removed from the topmost ply but over a lower ply secured edge-to-edge with said first ply.

13. An appparatus according to claim 12, further characterized by a. control means for lowering said hold-down means into engaged relation to said stack after actuation of said gripping means, to accommodate edge separation of successive plies, and b. control means for raising said hold-down means following said edge separation to release folded-over lower plies previously attached to the trailing edge of the topmost ply.

14. An apparatus for picking and separating limp plies from a stack thereof, which comprises a. means for gripping the top ply and displacing it away from one edge of the stack, b. stack hold-down means engageable with the stack in a region spaced between said edge and said gripping means, c. means for lifting said gripping means and a top ply held thereby away from the stack while said hold-down means is engaged with the stack, d. means for lifting the hold-down means substantially above the stack after said top ply has been removed by said lifting means, e. said gripping means being engageable with said top ply in a region spaced inwardly from said one edge of the stack a first predetermined distance and being operative to displace said top ply, generally in the direction of its initial plane, away from said edge through a second predetermined distance which is less than the first predetermined distance, and f. said hold-down means being positioned to engage said stack in a limited area located between said edge and said gripping means and spaced inward from said edge a distance less than the second predetermined distance but greater than one-half thereof.

15. Apparatus for separating and transporting limp plies one at a time from a stack thereof, which comprises a. means for gripping and lifting one edge portion of a top ply of the stack, b. hold-down means for engaging the stack below the top ply in the region of said one edge, c. a plate-like shutter means movable into interposition below said top ply and above the remainder of the stack, to fully separate said top ply from said stack, and d. means guiding said plate-like shutter for progressive interposing, longitudinal movement, entering adjacent said one edge and progressing toward and beyond the opposite edge, e. said plate-like shutter being of greater width than the plies of said stack, whereby progressive longitudinal interposing movement of the plate is operative to effect positive separation of the side edges of said top ply from lower plies, f. said means for gripping and lifting being engageable with limited areas only of said top ply, g. said plate-like shutter having a tapered leading edge portion adapted to be received initially between said top ply and said stack in the limited region in which said top ply is gripped and lifted, and h. said tapered leading edge portion progressively forcing outward and separating any edges of said top ply which are attached to said stack.

16. Apparatus for separating and transporting limp plies one at a time from a stack thereof, which comprises a. means for gripping and lifting one edge portion of a top ply of the stack, b. hold-down means for engaging the stack below the top ply in the region of said one edge, c. a plate-like shutter means movable into interposition below said top ply and above the remainder of the stack, to fully separate said top ply from said stack, d. means guiding said plate-like shutter for progressive interposing, longitudinal movement, entering adjacent said one edge and progessing toward and beyond the opposite edge, e. means for reciprocating said plate-like shutter between an interposed position, between said stack and top ply, and a predetermined destination position, and f. means independent of said gripping and lifting means effective to retain said top ply on said shutter during movement of the shutter and the ply to said destination position.

17. Apparatus for separating and transporting limp plies one at a time from a stack thereof, which comprises a. means for lifting one edge of a top ply of the stack, b. plate-like transport shutter means, c. means for guiding and actuating said plate-like shutter means in a plane above the top of the ply stack but below a lifted edge of the top ply, whereby a lifted top ply may be engaged and supported for transport by said shutter means, and d. means for actuating said shutter means to move with a ply to a predetermined destination position, e. said shutter means being movable between said top ply and said stack progressively from one end edge of the ply to the other, f. ply engaging means carried by said shutter means adjacent its leading edge and engageable with said other end edge of the top ply for positive engagement with said ply during movement of the shutter means toward said destination position, and g. means for effecting removal of a ply from said shutter means at said destination position, h. said means for effecting removal comprising means for retaining said ply and means for effecting return movement of said shutter means.

18. The apparatus of claim 17, furthr characterized by a. ply positioning means independent of said shutter means being mounted adjacent said destination position and engageable with said one end edge of the ply when said shutter means is in said destination position.

[19. An apparatus for separating and transporting limp plies one at a time from a ply stack, which comprises a. means to pick plies one at a time from a ply stack, b. a flat shutter plate for receiving plies one at a time from the picking means, c. means for actuating said shutter plate between ply receiving and ply delivering positions, and d. means for orienting said plies on said plate comprising a pair of sweep elements engageable with one end edge of a ply supported by said plate, near the center of said edge, and movable symmetrically away from said center while maintaining engagement between said edge and at least one of said sweep elements.]

[20. The apparatus of claim 19, further characterized by a. said sweep elements comprising a pair of pivotally mounted sweep arms having portions closely overlying said shutter plate and having edge engaging lugs engaging the surface of the plate, b. first control means for raising and lowering said sweep arms, and c. second control means for swinging said sweep arms outwardly to cause said edge engaging lugs to displace and reorient a misaligned ply.]

[21. The apparatus of claim 20, further characterized by a. third control means for effecting movement of said shutter plate in a direction to urge a ply supported thereon toward said edge engaging lugs during outward sweeping movements of said arms.]

[22. The apparatus of claim 21, further characterized by a. plies of material being discharged from said plate of said destination by movement of said plate while said sweep arms are lowered.]

23. The method of picking and removing limp plies one at a time from a stack, which comprises a. displacing a first limited area of the top ply through a predetermined limited distance generally in the plane of the ply and away from a predetermined edge of the ply, b. simultaneously restraining against displacement a second limited area portion of the top ply closely adjacent the first area and on the side thereof opposite said predetermined edge, whereby said ply is buckled into a wave, c. gripping said ply in the region of said wave, d. subsequent to displacement of said top ply, engaging and restraining the remainder of the stack of plies in a limited region located between said predetermined edge and said first limited area and spaced from said predetermined edge a distance greater than one-half of said predetermined distance, and e. thereafter removing said top ply.

24. The method of claim 23, further characterized by a. the step of removing said ply being effected by the progressive interposition of an element between the partly displaced top ply and the remainder of the stack to separate and support said top ply, and b. thereafter bodily removing the element and the top ply to another location.

25. The method of claim 23, further characterized by a. said first limited area being displaced a predetermined distance to effect formation of said wave, and b. said first limited area being urged for displacement through a greater distance in an opposite direction for effecting castoff.

26. The method of picking and removing limp plies, one at a time, from a stack which comprises a. controllably, yieldably engaging a first limited area of the top ply adjacent one edge of the ply and displacing it in a direction away from said one edge through a predetermined limited distance, b. thereafter pressing downward on the ply stack in a second limited area between said one edge and said first limited area and spaced from said one edge a distance less than, but greater than one-half of, the distance of displacement, whereby to engage all plies below the top, including any plies whose edges are connected to said one edge, c. said second limited area being sufficiently removed from said one edge to substantially avoid creasing of the folded-over margin of a connected lower ply, and d. thereafter lifting said top ply.

27. The method of claim 26, further characterized by a. said top ply being lifted a limited distance in said limited area, b. thereafter said top ply being fully separated from said stack by progressive interposition between said stack and said top ply of a flat element, c. after said full separation, said limited area of said top ply being released, d. the separated top ply being supported on substantially its entire bottom surface and transported laterally from said stack, and e. the transported ply being aligned and oriented while so supported, and then discharged.

28. The method of picking and removing limp plies, one at a time, from a stack, which comprises a. controllably, yieldably engaging a first limited area of the top ply adjacent one edge of the ply and displacing it in a direction away from said one edge through a predetermined limited distance, b. thereafter pressing downward on the ply stack in a second limited area between said one edge and said first limited area and spaced from said one edge a distance less than, but greater than one-half of, the distance of displacement, whereby to engage all plies below the top, including any plies whose edges are connected to said one edge, c. thereafter lifting said top ply, d. controllably, yieldably engaging said top ply in a second limited area, immediately adjacent said first area and on the side thereof opposite said one edge, e. restraining said second area while displacing the first to form a wave in the ply, f. nipping the ply near the base of the wave and lifting the nipped area, g. while continuing to nip the ply, interposing a member progressively between the ply and the stack to fully disengage and separate said ply from said stack, and h. after disengaging and separating said ply, transporting said ply to a predetermined destination while simultaneously commencing to engage a next successive ply in the sequence set forth in subparagraphs (a), (b) and (c) hereof.

[29. The method of orienting a limp ply after transportation thereof, on a flat plate to a destination, which comprises a. while the ply remains on the plate, interposing a pair of spaced edge engaging elements adjacent one end edge of the ply and spaced well inward from its side edges, b. thereafter moving said plate in a direction to move said end edges toward said edge engaging elements, and c. during engagement of said end edge with at least one of said elements and while continuing to move said plate in said direction, moving said edge engaging elements symmetrically outward from the center of the ply.]

[30. The method of claim 29, further characterized by a. continuing to move said plate in said direction while maintaining said edge in engagement with at least one of said elements, until said plate is fully removed from under said ply.]

*31. An apparatus for picking and separating plies of limp material, one at a time, from a stack, which comprises*

*(a) gripping means for engaging a first limited area of the top ply and displacing it away from one edge of the ply stack through a predetermined limited distance,*

*(b) ply stack hold-down means engageable with the top of the stack in a second limited area spaced from said one edge a distance less than, but greater than half the distance of displacement, whereby to engage all plies below the top ply, including any plies whose edges are connected to said top ply,*

*(c) control means for lowering said hold-down means into engaged relation to said stack after actuation of said gripping means, and*

*(d) means for lifting said top ply.*

*32. The method of picking and removing limp plies, one at a time, from a stack, which comprises*

*(a) engaging a first limited area of the top ply,*

*(b) displacing said first limited area away from one edge of the ply stack through a predetermined limited distance,*

*(c) subsequent to displacement of said top ply, engaging the top of the ply stack in a second limited area spaced from said one edge a distance less than, but greater than half of the distance of displacement, whereby to engage all plies below the top ply, including any plies whose edges are connected to said top ply, and*

*(d) thereafter removing said top ply.*

* * * * *